US012606700B2

(12) United States Patent
Ishii et al.

(10) Patent No.: US 12,606,700 B2
(45) Date of Patent: Apr. 21, 2026

(54) POLYESTER RESIN COMPOSITION, POLYESTER-BASED INJECTION-MOLDED ARTICLE, POLYESTER-BASED EXTRUDED ARTICLE, POLYESTER-BASED FOAM, POLYESTER-BASED CONTAINER, POLYESTER-BASED BOTTLE, POLYESTER-BASED TABLEWARE, AND POLYESTER-BASED NURSING BOTTLE

(71) Applicant: MITSUBISHI GAS CHEMICAL COMPANY, INC., Tokyo (JP)

(72) Inventors: Kentaro Ishii, Kanagawa (JP); Ken Taguwa, Kanagawa (JP); Masayuki Nagai, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 770 days.

(21) Appl. No.: 17/605,041

(22) PCT Filed: Apr. 22, 2020

(86) PCT No.: PCT/JP2020/017304

§ 371 (c)(1),
(2) Date: Oct. 20, 2021

(87) PCT Pub. No.: WO2020/218324

PCT Pub. Date: Oct. 29, 2020

(65) Prior Publication Data

US 2022/0204754 A1 Jun. 30, 2022

(30) Foreign Application Priority Data

Apr. 25, 2019 (JP) ................................ 2019-084202

(51) Int. Cl.

| | |
|---|---|
| ***C08L 67/02*** | (2006.01) |
| ***B29C 45/00*** | (2006.01) |
| ***B29K 67/00*** | (2006.01) |
| ***C08G 18/42*** | (2006.01) |
| ***C08G 18/79*** | (2006.01) |
| ***C08G 63/183*** | (2006.01) |
| ***C08G 63/189*** | (2006.01) |
| ***C08G 63/199*** | (2006.01) |
| ***C08K 5/29*** | (2006.01) |
| ***C08L 79/00*** | (2006.01) |

(52) U.S. Cl.

CPC ............ *C08L 67/02* (2013.01); *C08G 18/423* (2013.01); *C08G 18/797* (2013.01); *C08G 63/199* (2013.01); *C08L 79/00* (2013.01); *B29C 45/0001* (2013.01); *B29K 2067/00* (2013.01); *C08G 63/183* (2013.01); *C08G 63/189* (2013.01); *C08L 2203/10* (2013.01); *C08L 2203/30* (2013.01)

(58) Field of Classification Search

CPC ... C08L 67/02; B29K 2067/00; C08G 18/797; C08G 63/189; C08G 63/199; C08G 63/183; C08K 5/29

See application file for complete search history.

(56) References Cited

U.S. PATENT DOCUMENTS

| | | | | |
|---|---|---|---|---|
| 4,052,360 | A * | 10/1977 | Berardinelli | C08K 7/04 525/907 |
| 5,804,626 | A | 9/1998 | Rogers et al. | |
| 6,333,363 | B1 * | 12/2001 | Imashiro | C08J 11/06 525/437 |
| 2019/0071532 | A1 | 3/2019 | Strand et al. | |

FOREIGN PATENT DOCUMENTS

| | | | | |
|---|---|---|---|---|
| CN | 104497290 | A | | 4/2015 |
| JP | 7-292229 | A | | 11/1995 |
| JP | 11-506487 | A | | 6/1999 |
| JP | 2003-193330 | A | | 7/2003 |
| JP | 2012-224666 | A | | 11/2012 |
| JP | 2017105873 | A | * | 6/2017 |
| JP | 2018-184509 | A | | 11/2018 |
| KR | 10-2016-0073474 | | | 6/2016 |
| WO | 2010/110273 | A1 | | 9/2010 |
| WO | 2017/146949 | A1 | | 8/2017 |

OTHER PUBLICATIONS

Translation of JP 2017-105873 (no date).*

Yang et al. Stabilization of poly(lactic acid) by polycarbodiimide, Polymer Degradation and Stability 93 (2008), 1923-1929 (Year: 2008).*

Yamamoto, Ryota et al. (CA Database—Chemical Abstracts Service) "Polyester resin compositions with good transparency and appearance and molding thereof", XP002806385, retrieved from STN Database accession No. 2012:1662862 dated Nov. 15, 2012; related to JP 2012 224666.

International Search Report issued in International Patent Application No. PCT/JP2020/017304, dated Jul. 14, 2020, along with an English translation thereof.

Written Opinion of the International Searing Authority issued in International Patent Application No. PCT/JP2020/017304, dated Jul. 14, 2020, along with an English translation thereof.

* cited by examiner

*Primary Examiner* — Marc S Zimmer
*Assistant Examiner* — Surbhi M Du
(74) *Attorney, Agent, or Firm* — GREENBLUM & BERNSTEIN, P.L.C.

(57) ABSTRACT

The present application relates to a polyester resin composition that includes a polyester resin having a predetermined composition and a polycarbodiimide in a predetermined amount that exhibits heat resistance, transparency and impact resistance and prevents embrittlement after heat treatment. The present application also relates to a polyester-based injection-molded article, a polyester-based extruded article, a polyester-based foam, a polyester-based container, a polyester-based bottle, a polyester-based tableware, and a polyester-based nursing bottle.

11 Claims, No Drawings

POLYESTER RESIN COMPOSITION, POLYESTER-BASED INJECTION-MOLDED ARTICLE, POLYESTER-BASED EXTRUDED ARTICLE, POLYESTER-BASED FOAM, POLYESTER-BASED CONTAINER, POLYESTER-BASED BOTTLE, POLYESTER-BASED TABLEWARE, AND POLYESTER-BASED NURSING BOTTLE

TECHNICAL FIELD

The present invention relates to a polyester resin composition, a polyester-based injection-molded article, a polyester-based extruded article, a polyester-based foam, a polyester-based container, a polyester-based bottle, a polyester-based tableware and a polyester-based nursing bottle.

BACKGROUND ART

Aromatic saturated polyester resins, particularly polyethylene terephthalate (hereinafter, referred to as "PET" in some cases) is a resin well balanced among mechanical performance, solvent resistance, aroma retention, weather resistance, recyclability and the like, and broadly used centering on applications to bottles, films and the like. PET, however, has drawbacks to crystallinity and heat resistance. That is, with regard to the crystallinity, PET, since having high crystallinity, when thick molded articles and sheets are attempted to be produced, whitens due to crystallization and impairs transparency. With regard to the heat resistance, PET, since the glass transition temperature thereof is about 80° C., can be said to be unsuitable to applications requiring high heat resistance and transparency, such as products used in cars, packing materials for export/import, food packing materials subjected to retort treatment or microwave oven heating, and nursing bottles and tableware subjected to heat sterilization.

Hence, for applications requiring transparency, conventionally also used are low-crystallinity polyester resins such as modified PET partially copolymerized with 1,4-cyclohexanedimethanol, and modified PET partially copolymerized with isophthalic acid. The modified PET partially copolymerized with 1,4-cyclohexanedimethanol, and the modified PET partially copolymerized with isophthalic acid, however, though being improved in the transparency as compared with PET, have a glass transition temperature of about 80° C. and are inferior in the heat resistance.

For fields requiring heat resistance, there have been used polyester resins such as polyethylene 2,6-naphthalate (hereinafter, referred to as "PEN" in some cases) and poly(1,4-cyclohexane dimethylene terephthalate), which have a high glass transition temperature. Also PEN and poly(1,4-cyclohexane dimethylene terephthalate), however, though being improved in heat resistance, are high in crystallinity and inferior in transparency.

On the other hand, as a polyester resin having high transparency and simultaneously being improved in the heat resistance of PET and PEN, there is proposed a polyester resin containing a diol having a cyclic acetal skeleton (for example, see Patent Literature 1). Such a polyester resin can be utilized in applications requiring transparency and heat resistance.

CITATION LIST

Patent Literature

Patent Literature 1: Japanese Patent Laid-Open No. 2017-105873

SUMMARY OF INVENTION

Technical Problem

However, the polyester resin described in Patent Literature 1 has a problem of causing embrittlement when it is heated by an oven or hot water for a long time, while it has a certain heat resistance to the extent that its shape can be retained. Thus, in consideration of applications requiring high impact resistance also after heat treatment, there is still room for improvement.

The present invention has been achieved in consideration of the above problem of the conventional technology; an object of the present invention is to provide a polyester resin composition which is excellent in heat resistance, transparency and impact resistance and hardly causes embrittlement after heat treatment.

Solution to Problem

As a result of exhaustive studies, the present inventors have found that a polyester resin composition comprising a polyester resin having a predetermined composition and a polycarbodiimide in a predetermined amount is excellent in heat resistance, transparency and impact resistance and hardly causes embrittlement after heat treatment, and thus have completed the present invention.

That is, the present invention emcompasses the following aspects.

[1]

A polyester resin composition comprising: 97.0% by mass or more and 99.9% by mass or less of a polyester resin (A); and 0.1% by mass or more and 3.0% by mass or less of a polycarbodiimide (B), wherein a dicarboxylic acid constituent unit in the polyester resin (A) comprises a terephthalic acid unit and/or a 2,6-naphthalenedicarboxylic acid unit;

5% by mol or more and 90% by mol or less of a diol constituent unit in the polyester resin (A) is a unit derived from a diol having a cyclic acetal skeleton represented by the following formula (1) or formula (2), and 0% by mol or more and 90% by mol or less of the diol constituent unit is a unit derived from an alicyclic diol; and the polycarbodiimide (B) has two or more carbodiimide groups in one molecule thereof:

(1)

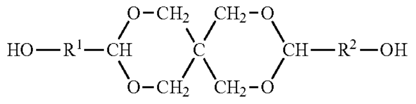

wherein $R^1$ and $R^2$ each independently represent an aliphatic group having 1 to 10 carbon atoms, an alicyclic group having 3 or more and 10 or less carbon atoms, or an aromatic group having 6 or more and 10 or less carbon atoms, and

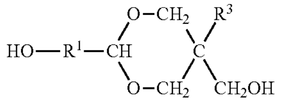

(2)

wherein $R^1$ is as defined above; and $R^3$ represents an aliphatic group having 1 or more and 10 or less carbon atoms, an alicyclic group having 3 or more and 10 or less carbon atoms, or an aromatic group having 6 or more and 10 or less carbon atoms.

[2]

The polyester resin composition according to [1], wherein the diol having the cyclic acetal skeleton is 3,9-bis(1,1-dimethyl-2-hydroxyethyl)-2,4,8,10-tetraoxaspiro[5.5]undecane.

[3]

The polyester resin composition according to [1], wherein the alicyclic diol is 1,4-cyclohexanedimethanol.

[4]

A polyester-based injection-molded article, comprising the polyester resin composition according to any one of [1] to [3].

[5]

A polyester-based extruded article, comprising the polyester resin composition according to any one of [1] to [3].

[6]

A polyester-based foam, comprising the polyester resin composition according to any one of [1] to [3].

[7]

A polyester-based container, comprising the polyester resin composition according to any one of [1] to [3].

[8]

A polyester-based bottle, comprising the polyester resin composition according to any one of [1] to [3].

[9]

A polyester-based tableware, comprising the polyester resin composition according to any one of [1] to [3].

[10]

A polyester-based nursing bottle, comprising the polyester resin composition according to any one of [1] to [3].

Advantageous Effects of Invention

The polyester resin composition according to the present invention is excellent in retention of heat resistance, transparency and impact resistance, and hardly causes embrittlement after heat treatment.

DESCRIPTION OF EMBODIMENT

Hereinafter, an embodiment to carry out the present invention (hereinafter, referred to simply as "present embodiment") will be described in detail. The following present embodiment is exemplification to interpret the present invention, and does not have the purport of limiting the present invention to the following contents. The present invention can be carried out by being suitably modified and changed within its gist.

<Polyester Resin Composition>

A polyester resin composition of the present embodiment is a polyester resin composition comprising: 97.0% by mass or more and 99.9% by mass or less of a polyester resin (A); and 0.1% by mass or more and 3.0% by mass or less of a polycarbodiimide (B), wherein a dicarboxylic acid constituent unit in the polyester resin (A) comprises a terephthalic acid unit and/or a 2,6-naphthalenedicarboxylic acid unit, 5% by mol or more and 90% by mol or less of a diol constituent unit in the polyester resin (A) is a unit derived from a diol having a cyclic acetal skeleton represented by the following formula (1) or formula (2), and 0% by mol or more and 90% by mol or less of the diol constituent unit is a unit derived from an alicyclic diol, and the polycarbodiimide (B) has two or more carbodiimide groups in one molecule thereof:

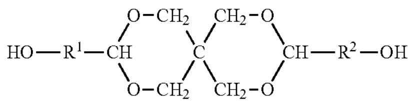

(1)

wherein $R^1$ and $R^2$ each independently represent an aliphatic group having 1 to 10 carbon atoms, an alicyclic group having 3 or more and 10 or less carbon atoms, or an aromatic group having 6 or more and 10 or less carbon atoms, and

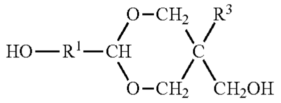

(2)

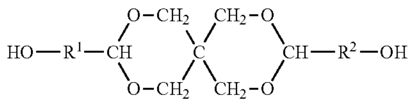

(1)

wherein $R^1$ is as defined above; and $R^3$ represents an aliphatic group having 1 or more and 10 or less carbon atoms, an alicyclic group having 3 or more and 10 or less carbon atoms, or an aromatic group having 6 or more and 10 or less carbon atoms.

The polyester resin composition of present embodiment, since being constituted as in the above, becomes one excellent in retention of heat resistance, transparency and impact resistance, and hardly causing embrittlement after heat treatment. Therefore, the polyester resin composition can suitably be used in applications requiring high heat resistance, such as products used in cars, packing materials for export/import, food packing materials subjected to retort treatment or microwave oven heating, and containers such as nursing bottles and tableware subjected to heat sterilization, and in other applications.

Hereinafter, each component contained in the polyester resin composition of the present embodiment will be described.

[Polyester Resin (A)]

The polyester resin (A), as described above, has a predetermined dicarboxylic acid constituent unit and diol constituent unit, and is contained in 97.0% by mass or more and 99.9% by mass or less with respect to 100% by mass of the polyester resin composition.

(Diol Constituent Unit)

The diol constituent unit in the polyester resin (A) contains a unit, derived from a diol having a cyclic acetal skeleton represented by the above formula (1) or formula (2), of 5% by mol or more and 90% by mol or less with respect to 100% by mol of the diol constituent unit and a unit, derived from an alicyclic diol, of 0% by mol or more and 90% by mol or less therewith. The unit derived from an alicyclic diol in the present embodiment is an optional constituent unit which may not be contained in the polyester resin (A).

(Unit Derived from a Diol Having a Cyclic Acetal Skeleton)

In the above formulae (1) and (2), $R^1$ and $R^2$ are each independently an aliphatic group having 1 or more and 10 or less carbon atoms, an alicyclic group having 3 or more and 10 or less carbon atoms, or an aromatic group having 6 or more and 10 or less carbon atoms, and, preferably represent a methylene group, an ethylene group, a propylene group, a butylene group, or a structural isomer thereof, for example, an isopropylene group or an isobutylene group. $R^3$ is an aliphatic group having 1 or more and 10 or less carbon atoms, an alicyclic group having 3 or more and 10 or less carbon atoms, or an aromatic group having 6 or more and 10 or less carbon atoms, and preferably represents a methyl group, an ethyl group, a propyl group, a butyl group, or a structural isomer thereof, for example, an isopropyl group or an isobutyl group. The diol having a cyclic acetal skeleton represented by the above formula (1) is especially preferably 3,9-bis(1,1-dimethyl-2-hydroxyethyl)-2,4,8,10-tetraoxaspiro[5.5]undecane; and the diol having a cyclic acetal skeleton represented by the above formula (2) is especially preferably 5-methylol-5-ethyl-2-(1,1-dimethyl-2-hydroxyethyl)-1,3-dioxane.

(Unit Derived from an Alicyclic Diol)

An alicyclic diol unit in the diol constituent unit in the polyester resin (A) is not especially limited, but examples thereof include units derived from diols such as 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornenedimethanol, tricyclodecanedimethanol and pentacyclododecanedimethanol; and the alicyclic diol unit is preferably a unit derived from 1,4-cyclohexanedimethanol, a unit derived from norbornenedimethanol, a unit derived from tricyclodecanedimethanol or a unit derived from 2,6-decahydronaphthalenedimethanol, and is especially preferably a unit derived from 1,4-cyclohexanedimethanol.

(Other Diol Constituent Units)

The diol constituent unit of the present embodiment may contain other diol constituent units other than the diol unit having a cyclic acetal skeleton and the alicyclic diol unit. The content of the other diol constituent units can be made to be, with respect to 100% by mol of the diol constituent unit, 0% by mol or more and 95% by mol or less. The other diol constituent units can be exemplified by units derived from diols including aliphatic diols such as ethylene glycol, trimethylene glycol, 1,4-butanediol, 1,5-pentanediol, 1,6-hexanediol, diethylene glycol, propylene glycol and neopentylglycol; polyether compounds such as polyethylene glycol, polypropylene glycol and polybutylene glycol; bisphenols such as 4,4'-(1-methylethylidene)bisphenol, methylenebisphenol (bisphenol F), 4,4'-cyclohexylidenebisphenol (bisphenol Z) and 4,4'-sulfonylbisphenol (bisphenol S); alkylene oxide adducts of the above bisphenols; aromatic dihydroxy compounds such as hydroquinone, resorcinol, 4,4'-dihydroxybiphenyl, 4,4'-dihydroxydiphenyl ether and 4,4'-dihydroxydiphenylbenzophenone; and alkylene oxide adducts of the above aromatic dihydroxy compounds. In the case of containing the other diol constituent units, in consideration of the mechanical strength, the heat resistance and the easy availability of the polyester resin, a preferable unit is a unit derived from ethylene glycol.

(Dicarboxylic Acid Constituent Unit)

A dicarboxylic acid constituent unit in the polyester resin (A) contains a terephthalic acid unit and/or 2,6-naphthalenedicarboxylic acid unit. Here, the terephthalic acid unit means a unit derived from terephthalic acid; and the 2,6-naphthalenedicarboxylic acid unit means a unit derived from 2,6-naphthalenedicarboxylic acid. The dicarboxylic acid constituent unit may contain other dicarboxylic acid constituent units in the range of not impairing the object of the present embodiment. The other dicarboxylic acid constituent units include, though limited to the following, units derived from aliphatic dicarboxylic acids such as succinic acid, glutaric acid, adipic acid, pimelic acid, suberic acid, azelaic acid, sebacic acid, decanedicarboxylic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane and 5-carboxy-5-ethyl-2-(1,1-dimethyl-2-carboxyethyl)-1,3-dioxane; and units derived from aromatic dicarboxylic acids such as isophthalic acid, phthalic acid, 2-methylterephthalic acid, 1,4-naphthalenedicarboxylic acid, 1,5-naphthalenedicarboxylic acid, 2,7-naphthalenedicarboxylic acid, biphenyldicarboxylic acid and tetralindicarboxylic acid. In the present embodiment, from the viewpoint of sufficiently enhancing the balance among physical properties such as transparency, heat resistance, impact resistance and mechanical strength of the polyester resin (A), the terephthalic acid unit and/or the 2,6-naphthalenedicarboxylic acid unit is contained, with respect to 100% by mol of the dicarboxylic acid constituent unit, preferably in 80% by mol or more and 100% by mol or less, more preferably in 90% by mol or more and 100% by mol or less, and especially preferably in 100% by mol.

Since in the polyester resin (A), the crystallinity decreases and the glass transition temperature rises due to that the above unit derived from a diol having a cyclic acetal skeleton is contained in 5% by mol or more and 90% by mol or less with respect to 100% by mol of the whole diol constituent unit, the polyester resin (A) becomes one consequently having high transparency and also having high heat resistance. The polyester resin (A) becomes one good in the balance between the transparency and the heat resistance also as compared with, for example, polyester resins having units derived from ethylene glycol and 1,4-cyclohexanedimethanol accounting for 100% by mol of the diol constituent unit, and other polyester resins such as PET, polybutylene terephthalate and polylactic acid. From the similar viewpoint, the polyester resin (A) has the above unit derived from a diol having a cyclic acetal skeleton in a proportion of preferably 15% by mol or more and 80% by mol or less and more preferably 20% by mol or more and 70% by mol or less.

The polyester resin (A) contains the above unit derived from an alicyclic diol of 0% by mol or more and 90% by mol or less with respect to 100% by mol of the whole diol constituent unit. In the present embodiment, from the viewpoint of more improving the impact resistance of the polyester resin (A), the unit derived from an alicyclic diol is contained preferably in 10% by mol or more and 90% by mol or less, and more preferably in 15% by mol or more and 90% by mol or less.

In the present embodiment, from the viewpoint of the impact resistance, the polyester resin (A) includes polyester resins in which 15% by mol or more and 50% by mol or less of the diol constituent unit in the polyester resin (A) is the unit derived from a diol having a cyclic acetal skeleton, and 15% by mol or more and 85% by mol or less thereof is the unit derived from an alicyclic diol.

In the present embodiment, particularly in consideration of the balance among transparency, heat resistance, impact resistance, mechanical strength and the like, it is preferable that: 100% by mol of the dicarboxylic acid constituent unit in the polyester resin (A) is a terephthalic acid unit and/or 2,6-naphthalenedicarboxylic acid; and 5% by mol or more and 90% by mol or less of the diol constituent unit is a unit derived from 3,9-bis(1,1-dimethyl-2-hydroxyethyl)-2,4,8,10-tetraoxaspiro[5.5]undecane, 0% by mol or more and 90% by mol or less thereof is a unit derived from 1,4-cyclohexanedimethanol, and 0% by mol or more and 90% by mol or less thereof is a unit derived from ethylene glycol. From the similar viewpoint, it is especially preferable that: 100% by mol of the dicarboxylic acid constituent unit in the polyester resin (A) is a terephthalic acid unit and/or 2,6-naphthalenedicarboxylic acid unit; and 15% by mol or more and 50% by mol or less of the diol constituent unit is a unit derived from 3,9-bis(1,1-dimethyl-2-hydroxyethyl)-2,4,8,10-tetraoxaspiro[5.5]undecane, 15% by mol or more and 85% by mol or less thereof is a unit derived from 1,4-cyclohexanedimethanol, and 0% by mol or more and 70% by mol or less thereof is a unit derived from ethylene glycol.

(Other Constituent Units)

The polyester resin (A) may contain, in the range of not impairing the object of the present embodiment, monoalcohol units such as butyl alcohol, hexyl alcohol and octyl alcohol, tri- or more polyhydric alcohol units such as trimethylolpropane, glycerol, 1,3,5-pentanetriol and pentaerythritol, monocarboxylic acid units such as benzoic acid, propionic acid and bytyric acid, pentavalent carboxylic acid units such as trimellitic acid and pyromellitic acid, and oxy acid units such as glycolic acid, lactic acid, hydroxybutyric acid, 2-hydroxyisobutyric acid and hydroxybenzoic acid.

A method for producing the polyester resin of the present embodiment is not especially limited, and a conventionally well-known method can be applied. Examples thereof include melt polymerization methods or solution polymerization methods including a transesterification process, a direct esterification process or the like. With regard to transesterification catalysts, esterification catalysts, etherification inhibitors, various types of stabilizers such as heat stabilizers and light stabilizers, polymerization regulators, and the like, those conventionally well-known can be used.

[Polycarbodiimide (B)]

The polycarbodiimide (B) in the present embodiment is not especially limited as long as having 2 or more carbodiimide groups in one molecule thereof, and various well-known ones can be used. Examples thereof include aromatic polycarbodiimide and aliphatic polycarbodiimide described later.

The aromatic polycarbodiimide is a compound in which a carbodiimide group is bound directly to an aromatic ring, and can be synthesized, though not limited to, for example, by a decarboxylation condensation reaction of a diisocyanate using a carbodiimidization catalyst such as an organophosphorus compound or an organometal compound. Specific examples of the diisocyanate include, though not limited to, 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, 3,3',5,5'-tetraisopropylbiphenyl-4,4'-diisocyanate and 1,3,5-triisopropylbenzene-2,4-diisocyanate. These may be used singly or concurrently in two or more. Among these, from the viewpoint of the stability, preferable are 4,4'-diphenylmethane diisocyanate and 1,3,5-triisopropylbenzene-2,4-diisocyanate.

The aliphatic polycarbodiimide is a compound in which a carbodiimide group is bound to a carbon atom excluding an aromatic ring, and can similarly be synthesized, though not especially limited to, by a decarboxylation condensation reaction of a diisocyanate using a carbodiimidization catalyst such as an organophosphorus compound or an organometal compound. Specific examples of the diisocyanate include, though not limited to, hexamethylene diisocyanate, cyclohexane-1,4-diisocyanate, isophorone diisocyanate, 4,4'-dicyclohexylmethane diisocyanate, methylcyclohexane diisocyanate, 1,3-bis(isocyanatomethyl)cyclohexane, xylylene diisocyanate and tetramethylxylylene diisocyanate. These may be used singly or concurrently in two or more. Among these, from the viewpoint of the stability, 4,4'-dicyclohexylmethane diisocyanate is preferable.

The aromatic polycarbodiimide or the aliphatic polycarbodiimide can be blocked by being reacted with a monofunctional compound having reactivity with isocyanate groups of terminals of a diisocyanate to be used for the synthesis to regulate the degree of polymerization. Specific examples of such a compound include, though not limited to, monoisocyanates such as phenyl isocyanate, tolyl isocyanate, isopropylphenyl isocyanate and cyclohexyl isocyanate; alcohols such as methanol, isopropyl alcohol, phenol and polyethylene glycol monomethyl ether; amines such as butylamine, diethylamine and cyclohexylamine; and carboxylic acids such as propionic acid and benzoic acid.

The degree of polymerization of the polycarbodiimide (B) is, from the viewpoint of improving the impact resistance of the polyester resin composition and suppressing the embrittlement thereof after the heat treatment, preferably 2 or more and 50 or less and more preferably 5 or more and 30 or less. From the viewpoint of more improving the impact resistance of the polyester resin composition and more suppressing the embrittlement thereof after the heat treatment, it is especially preferable to use, as the polycarbodiimide (B), an aliphatic polycarbodiimide having a degree of polymerization of 5 or more and 30 or less and made from 4,4'-dicyclohexylmethane diisocyanate.

The polycarbodiimide (B) may be used singly in one kind of aromatic polycarbodiimide and aliphatic polycarbodiimide, or may be used concurrently in two or more kinds thereof. In the present embodiment, from the viewpoint of the stability, and the reactivity of the carbodiimide group, it is preferable to use an aliphatic polycarbodiimide.

(Mechanism of Action)

Here, the mechanism of action relevant to the polyester resin composition of the present embodiment will be described, but the description is based on presumption and has no purport of being limited to the following mechanism of action.

That is, the polyester resin (A), as described above, exhibits excellent performance in heat resistance, transparency and impact resistance, but in the polyester resin composition of the present embodiment, by extension or branching of the molecular chain of the polyester resin (A) by the polycarbodiimide (B), not only there can be provided good balance among physical properties of the heat resistance, the transparency and the impact resistance, but also there can be made the balance among the physical properties especially good. That is, the action of the polycarbodiimide (B), conjointly with the performance of the polyester resin (A), secures good heat resistance and transparency and simultaneously improves particularly the impact resistance, and also brings about the effect of remarkably suppressing embrittlement after the heat treatment. From the above viewpoint, the content of the polyester resin (A) with respect to 100% by mass of the polyester resin composition is made to be 97.0% by mass or more, and the content of the polycarbodiimide (B) therewith is made to be 3.0% by mass or less. When the content of the polyester resin (A) is less than 97.0% by mass, it becomes difficult for the balance among the heat resistance, the transparency and the impact resistance to be secured. When the content of the polycarbodiimide (B) exceeds 3.0% by mass, the impact resistance becomes insufficient due to aggregated substances, deteriorated substances, gelated substances and the like caused by the polycarbodiimide (B), and it becomes easy for the embrittlement after heat treatment to extremely advance. Therefore, it becomes important that the polyester resin composition of the present embodiment contains 97.0% by mass or more and 99.9% by mass or less of the polyester resin (A) and 0.1% by mass or more and 3.0% by mass or less of the polycarbodiimide (B). From the above-mentioned viewpoint, it is preferable that the content of the polyester resin (A) in the polyester resin composition is 98.0% by mass or more and 99.9% by mass or less, and it is more preferable that that is 99.0% by mass or more and 99.9% by mass or less. Similarly, it is preferable that the content of the polycarbodiimide (B) in the polyester resin composition is 0.1% by mass or more and 2.0% by mass or less: it is more preferable that that is 0.1% by mass or more and 1.0% by mass or less; and it is still more preferable that that is 0.2% by mass or more and 1.0% by mass or less.

A method of adding the polycarbodiimide (B) and optional components described later to the polyester resin (A) is not especially limited, but melt kneading by an extruder is preferable. At this time, a master batch may be fabricated by melt kneading a polycarbodiimide of a high concentration and diluted at the molding time so as to have a predetermined concentration and used.

[Optional Components]

The polyester resin composition of the present embodiment may further contain optional components other than the polyester resin (A) and the polycarbodiimide (B). Such optional components are not limited to the following, but there can be used, for example, various types of additives such as antioxidants, light stabilizers, ultraviolet absorbents, plasticizers, extenders, matting agents, drying regulators, antistatic agents, antisettling agents, surfactants, flow improvers, drying oils, waxes, fillers, colorants, reinforcers, surface smoothing agents, leveling agents and curing reaction accelerators, and molding auxiliary agents. The optional components may contain resins such as polyolefin resins, polyester resins excluding the polyester resin (A), polyamide resins, polycarbonate resins, acrylonitrile resins, vinyl chloride resins, vinyl acetate resins, polyacrylic acid resins, polymethacrylic acid resins, polystyrene, ABS resins, polyimide resins and AS resins, and oligomers thereof. The content of the optional components is not especially limited, but from the viewpoint of securing good heat resistance and transparency, improving impact resistance and also effectively suppressing embrittlement after heat treatment, is made to be, with respect to 100% by mass of the polyester resin composition, preferably 2.9% by mass or less, more preferably 1.0% by mass or less and especially preferably 0.5% by mass or less.

[Physical Properties]

The glass transition temperature of the polyester resin (A) is preferably 95° C. or more, more preferably 110° C. or more and still more preferably 130° C. or more. In the case where the glass transition temperature is in the above range, the polyester resin composition of the present embodiment is likely to be excellent in heat resistance. Therefore, the polyester resin composition becomes enabled to be used in applications requiring high heat resistance, in which conventional PET and modified PET partially copolymerized with 1,4-cyclohexanedimethanol or isophthalic acid cannot be used. The polyester resin composition, for example, since becoming enabled to be used in cars and ship holds (the temperature of which is said to reach 70 to 80° C.) crossing the equator, can suitably be used for interiors of cars, containers for aromatics, eyedrops and the like used in cars, and packing materials used for export/import such as blister packs. Further, the polyester resin composition can also suitably be used in applications subjected to high-temperature treatment, such as food packing materials subjected to microwave oven heating or retort treatment, and containers such as nursing bottles and tableware subjected to heat sterilization. The above glass transition temperature can be measured based on a method described in Examples described later. The glass transition temperature can be regulated in the above-mentioned preferable range, for example, by suitable selection of the dicarboxylic acid constituent unit and the diol constituent unit in the polyester resin (A) based on the above-mentioned preferable aspect.

The heat quantity of a crystallization exothermic peak in temperature drop of the polyester resin (A) is preferably 5 J/g or less and more preferably 3 J/g or less. In the case where the crystallization exothermic peak in temperature drop is in the above range, the crystallinity of the polyester resin composition of the present embodiment is likely to become lower, and the polyester resin composition can suitably be used in applications requiring high transparency. The heat quantity of the crystallization peak in temperature drop can be measured based on a method described in Examples described later. The heat quantity of the crystallization peak in temperature drop can be regulated in the above-mentioned preferable range, for example, by suitable selection of the dicarboxylic acid constituent unit and the diol constituent unit in the polyester resin (A) based on the above-mentioned preferable aspect.

The haze of a test piece of 3.2 mm in thickness obtained by injection molding the polyester resin composition of the present embodiment is preferably 4% or less and more preferably 3% or less. In the case where the haze is in the above range, the polyester resin composition of the present embodiment is likely to exhibit higher transparency. The haze can be measured based on a method described in Examples described later. The haze can be regulated in the above-mentioned preferable range, for example, by suitable selection of the dicarboxylic acid constituent unit and the diol constituent unit in the polyester resin (A) based on the above-mentioned preferable aspect.

10 test pieces with no notch of 63.5 mm in length, 12.7 mm in width and 3.2 mm in thickness obtained by injection molding the polyester resin composition of the present embodiment are dipped in hot water at 50 to 100° C. for 24 hours, and thereafter subjected to an Izod test using a hammer having a capacity of 4 J; and the number of the test pieces broken by the Izod test is preferably two or less and more preferably one or less. In the case where the number of the test pieces broken is in the above range, the polyester resin composition of the present embodiment is likely to exhibit a practically sufficient impact resistance in many applications. The number of the test pieces broken can be measured based on a method described in Examples described later. The number of the test pieces broken can be regulated in the above-mentioned preferable range, for example, by suitable selection of the dicarboxylic acid constituent unit and the diol constituent unit in the polyester resin (A) based on the above-mentioned preferable aspect.

The polyester resin composition of the present embodiment, by making the 2,6-naphthalenedicarboxylic acid unit in the dicarboxylic acid constituent unit in the polyester resin (A) to be in a suitable proportion, can be imparted further with the UV barrier property. Specifically, in the case where 0.1% by mol or more and 100% by mol or less of the dicarboxylic acid constituent unit is the 2,6-naphthalenedicarboxylic acid unit, the polyester resin composition of the present embodiment is likely to become good in the UV barrier property. From the similar viewpoint, it is especially preferable that 90% by mol or more and 100% by mol or less of the dicarboxylic acid constituent unit in the polyester resin (A) is the 2,6-naphthalenedicarboxylic acid unit.

The polyester resin composition of the present embodiment can further also contain, as polyester resins other than the polyester resin (A), thermoplastic resins such as polyethylene terephthalate and polybutylene terephthalate, unless it defeats the purpose. Also in this case, the polyester resin composition can be prepared by melt kneading the polyester resin (A), the polycarbodiimide (B) and the thermoplastic resins.

<Applications of the Polyester Resin Composition>

The polyester resin composition of the present embodiment can be used in various applications. The polyester resin composition can be used, for example, for injection-molded articles, and extruded articles such as sheets, films and pipes, bottles, foams, pressure-sensitive materials, adhesive agents and coating materials. In more detail, the injection-molded articles may also be by insert molding or two color molding. The sheets may be of a single layer or a multilayer; and the films may also be of a single layer or a multilayer. The films may be unstretched ones, or may be uniaxially or biaxially stretched ones, or may be laminated on steel sheets or the like. The films may be by inflation molding. The bottles may be direct blow bottles or injection blow bottles, or may be by injection molding. The foams may be bead foams or extruded foams. The polyester resin composition can suitably be used particularly in applications requiring high heat resistance, such as products used in cars, packing materials for export/import, food packing materials subjected to retort treatment or microwave oven heating, and containers such as nursing bottles and tableware subjected to heat sterilization. Further, the polyester resin composition can suitably be used for packing materials for containers requiring the UV barrier property. That is, a polyester-based injection-molded article, a polyester-based extruded article, a polyester-based foam, a polyester-based container, a polyester-based bottle, a polyester-based tableware and a polyester-based nursing bottle of the present embodiment each can be said to contain the polyester resin composition of the present embodiment. These are not especially limited as long as containing the polyester resin composition of the present embodiment, and can be made into various types of well-known forms according to corresponding applications.

EXAMPLES

Hereinafter, the present embodiment will be described in more detail by way of Examples, but the scope of the present embodiment is not any more limited to these Examples.

[Evaluation Methods]

Evaluation methods of polyester resins and polyester resin compositions in the present Examples were as follows.

(1) The Proportions of a Diol Unit Having a Cyclic Acetal Skeleton and an Alicyclic Diol Unit The proportions of a unit derived from a diol having a cyclic acetal skeleton and a unit derived from an alicyclic diol in a polyester resin were calculated by $^{1}$H-NMR measurement. The measurement was carried out by an Ascend™500, manufactured by Bruker BioSpin K.K. A solvent used was deuterated chloroform.

(2) The Glass Transition Temperature and the Crystallization Exothermic Peak in Temperature Drop The glass transition temperature (Tgm) of a polyester resin was measured by using a differential scanning colorimeter (type: DSC/TA-50WS), manufactured by Shimadzu Corp., and by putting about 10 mg of a sample in an aluminum unsealed container and heating the sample at a temperature-rise rate of 20° C./min in a nitrogen gas flow (30 mL/min); and a temperature on a DSC curve at which the temperature thereon changed by ½ of the difference between baselines before and after the transition in the DSC curve was taken as the glass transition temperature. After the temperature of the sample was held at 280° C. for 1 min after the above measurement of the glass transition temperature, the crystallization exothermic peak in temperature drop was measured from an area of an exothermic peak emerging when the temperature was made to drop at a temperature-drop rate of 10° C./min.

(3) The Haze

The haze was measured according to JIS K7105 and ASTM D1003. That is, after a disc of 50 mm in diameter and 3.2 mm in thickness obtained by injection molding a polyester resin composition was humidity conditioned for 48 hours, the haze was measured in an atmosphere of a temperature of 23° C. and a relative humidity of 50%. A measuring apparatus used was a haze meter (type: COH-300A), manufactured by Nippon Denshoku Industries Co., Ltd.

(4) The Impact Resistance

The impact resistance was evaluated by an Izod test according to JIS K7110. 10 test pieces with no notch of 63.5 mm in length, 12.7 mm in width and 3.2 mm in thickness obtained by injection molding a polyester resin composition are dipped in hot water at 50° C., 60° C. or 100° C. for 24 hours, and thereafter tested by using a hammer having a capacity of 4 J in an atmosphere of 23° C. and a relative humidity of 50%, and the number of the test pieces broken was measured. A tester used was an Izod impact tester manufactured by Ueshima Siesakusho Co., Ltd.

Production Examples 1 to 3

[Synthesis of Polyester Resins (PEs-1, PEs-2 and PEs-3)]

Raw material monomers described in Table 1 were charged in a 30 L-volume polyester production apparatus equipped with a packed rectifying column, a partial condenser, a total condenser, a cold trap, a stirrer, a heating device and a nitrogen introducing tube; tetra-n-butoxytitanium of 0.005% by mol with respect to a dicarboxylic acid component and potassium acetate of 0.02% by mol therewith were added; and the temperature was raised up to 225° C. in a nitrogen atmosphere to carry out transesterification. After the reaction conversion rate of the dicarboxylic acid component was made to be 90% or more, germanium dioxide of 0.025% by mol with respect to the dicarboxylic acid component and triethyl phosphate of 0.05% by mol therewith were added; the temperature raise and the pressure reduction were slowly carried out and polycondensation was carried out finally at 280° C. at 0.1 kPa or less. The reaction was finished at the time point when a suitable melt viscosity was made, to thereby synthesize each of polyester resins PEs-1, PEs-2 and PEs-3.

TABLE 1

| | Production Example 1 (PEs-1) | Production Example 2 (PEs-2) | Production Example 3 (PEs-3) |
|---|---|---|---|
| Amount of Monomer Charged Dicarboxylic acid component (mol) | | | |
| DMT | 0 | 49.8 | 62.4 |
| NDCM | 31.2 | 0 | 0 |
| Diol component (mol) | | | |
| EG | 35.9 | 89.6 | 112.3 |
| SPG | 13.0 | 23.3 | 0 |
| CHDM | 20.3 | 0 | 0 |
| Evaluation Results of Polyester resin | | | |
| Proportion of a unit derived from a diol having a cyclic acetal skeleton (% by mol) | 38.9 | 44.3 | 0 |
| Proportion of a unit derived from an alicyclic diol (% by mol) | 53.3 | 0 | 0 |
| Glass transition temperature (° C.) | 135 | 110 | 81 |
| Crystallization exothermic peak in temperature drop (J/g) | 0 | 0 | 35 |

Abbreviations in Table 1 are as follows.
DMT: dimethyl terephthalate
NDCM dimethyl 2,6-naphthalenedicarboxylate
EG: ethylene glycol
SPG: 3,9-bis(1,1-dimethyl-2-hydroxyethyl)-2,4,8,10-tetraoxaspiro[5.5]undecane
CHDM: 1,4-cyclohexanedimethanol

[Polycarbodiimide]

A polycarbodiimide used was Carbodilite HMV-15CA (an aliphatic polycarbodiimide made from 4,4'-dicyclohexylmethane diisocyanate, degree of polymerization: 15), manufactured by Nisshinbo Chemical Inc.

Example 1

(Fabrication of Kneaded Pellets)

A twin-screw kneading extruder (manufactured by Toshiba Machine Co., Ltd., type: TEM26SX, screw diameter: 26 mmϕ, L/D: 48) was used. The polyester resin synthesized in Production Example 1 and the polycarbodiimide were dry blended in a ratio of 99.9/0.1% by mass and charged from a hopper. A strand was extruded under the conditions of a cylinder temperature of 180 to 260° C., a die temperature of 260° C., a screw rotation frequency of 75 rpm, and a discharge of 15 kg/h and water cooled, and thereafter pelletized to thereby obtain polyester resin/polycarbodiimide kneaded pellets.

(Injection Molding of the Kneaded Pellets)

Then, the obtained kneaded pellets were injection molded. The injection molding used an injection molding machine of type: J85AD, manufactured by Japan Steel Works, Ltd., and was carried out under the conditions of a cylinder temperature of 245 to 280° C. and a mold temperature of 15 to 50° C. By using molded test pieces, the haze measurement, and the Izod test after dipping in hot water at 100° C. for 24 hours were carried out. The results are shown in Table 2.

Examples 2 to 10

Test pieces were produced and evaluated as in Example 1, except for altering the polyester resin used, the kneaded ratios thereof and the polycarbodiimide, and the hot water dipping temperature to those indicated in Table 2. The results are shown in Table 2.

Comparative Examples 1 to 6

Test pieces were produced and evaluated as in Example 1, except for altering the polyester resin used, the kneaded ratios thereof and the polycarbodiimide, and the hot water dipping temperature to those indicated in Table 3. The results are shown in Table 3.

TABLE 2

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Polyester Resin Composition | | | | | | | | | | |
| Polyester resin | PEs-1 | PEs-1 | PEs-1 | PEs-1 | PEs-1 | PEs-1 | PEs-2 | PEs-2 | PEs-2 | PEs-2 |
| Polyester resin ratio (% by mass) | 99.9 | 99.8 | 99.7 | 99.5 | 99.0 | 97.0 | 99.9 | 99.5 | 99.0 | 97.0 |
| Polycarbodiimide ratio (% by mass) | 0.1 | 0.2 | 0.3 | 0.5 | 1.0 | 3.0 | 0.1 | 0.5 | 1.0 | 3.0 |
| Injected Test Piece | | | | | | | | | | |
| Haze (%) | 1.4 | 1.4 | 1.4 | 1.4 | 1.7 | 2.2 | 0.6 | 0.7 | 0.7 | 1.4 |
| Hot water dipping temperature (° C.) | 100 | 100 | 100 | 100 | 100 | 100 | 60 | 60 | 60 | 60 |
| Number of Izod tests broken (number) | 2 | 0 | 0 | 0 | 0 | 2 | 2 | 0 | 0 | 1 |

TABLE 3

| | Comparative Example 1 | Comparative Example 2 | Comparative Example 3 | Comparative Example 4 | Comparative Example 5 | Comparative Example 6 |
|---|---|---|---|---|---|---|
| Polyester Resin Composition | | | | | | |
| Polyester resin | PEs-1 | PEs-1 | PEs-2 | PEs-2 | PEs-3 | PEs-3 |
| Polyester resin ratio (% by mass) | 100 | 95.0 | 100 | 95.0 | 100 | 99.0 |
| Polycarbodiimide ratio (% by mass) | 0 | 5.0 | 0 | 5.0 | 0 | 1.0 |

TABLE 3-continued

| | Comparative Example 1 | Comparative Example 2 | Comparative Example 3 | Comparative Example 4 | Comparative Example 5 | Comparative Example 6 |
|---|---|---|---|---|---|---|
| Injected Test Piece | | | | | | |
| Haze (%) | 0.7 | 3.5 | 0.6 | 2.7 | 0.5 | 0.7 |
| Hot water dipping temperature (° C.) | 100 | 100 | 60 | 60 | 50 | 50 |
| Number of Izod tests broken (number) | 8 | 5 | 8 | 6 | 10 | 10 |

The polyester resin compositions according to Examples 1 to 10 were greatly improved in the impact resistance after hot water dipping as compared with the polyester resin compositions according to Comparative Examples 1 to 6.

The present application claims the priority based on Japanese Patent Application (Japanese Patent Application No. 2019-084202), filed on Apr. 25, 2019, the entire contents of which are hereby incorporated by reference.

INDUSTRIAL APPLICABILITY

The polyester resin composition of present invention is excellent in retention of heat resistance, transparency and impact resistance, and can suitably be used in applications requiring high heat resistance, such as products used in cars, packing materials for export/import, food packing materials subjected to retort treatment or microwave oven heating, and containers such as nursing bottles and tableware subjected to heat sterilization, and in other applications; thus, the industrial significance of the present invention is large.

The invention claimed is:

1. A polyester resin composition comprising: 97.0% by mass or more and 99.9% by mass or less of a polyester resin (A); and 0.1% by mass or more and 3.0% by mass or less of a polycarbodiimide (B), wherein a dicarboxylic acid constituent unit in the polyester resin (A) comprises a terephthalic acid unit and/or a 2,6-naphthalenedicarboxylic acid unit, 5% by mol or more and 90% by mol or less of a diol constituent unit in the polyester resin (A) is a unit derived from a diol having a cyclic acetal skeleton represented by the following formula (1) or formula (2), and 0% by mol or more and 90% by mol or less of the diol constituent unit is a unit derived from an alicyclic diol, and the polycarbodiimide (B) has two or more carbodiimide groups in one molecule thereof:

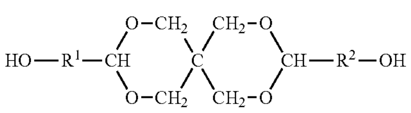

(1)

wherein $R^1$ and $R^2$ each independently represent an aliphatic group having 1 to 10 carbon atoms, an alicyclic group having 3 or more and 10 or less carbon atoms, or an aromatic group having 6 or more and 10 or less carbon atoms, and

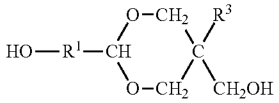

(2)

wherein $R^1$ is as defined above; and $R^3$ represents an aliphatic group having 1 or more and 10 or less carbon atoms, an alicyclic group having 3 or more and 10 or less carbon atoms, or an aromatic group having 6 or more and 10 or less carbon atoms, and wherein the polycarbodiimide (B) comprises an aliphatic polycarbodiimide, and has a degree of polymerization of 5 or more and 30 or less.

2. The polyester resin composition according to claim 1, wherein the diol having the cyclic acetal skeleton is 3,9-bis (1,1-dimethyl-2-hydroxyethyl)-2,4,8,10-tetraoxaspiro[5.5] undecane.

3. The polyester resin composition according to claim 1, wherein the alicyclic diol is 1,4-cyclohexanedimethanol.

4. A polyester-based injection-molded article comprising the polyester resin composition according to claim 1.

5. A polyester-based extruded article comprising the polyester resin composition according to claim 1.

6. A polyester-based foam comprising the polyester resin composition according to claim 1.

7. A polyester-based container comprising the polyester resin composition according to claim 1.

8. A polyester-based bottle comprising the polyester resin composition according to claim 1.

9. A polyester-based tableware comprising the polyester resin composition according to claim 1.

10. A polyester-based nursing bottle comprising the polyester resin composition according to claim 1.

11. The polyester resin composition according to claim 1, wherein an optional component is included in an amount of 2.9% by mass or less with respect to 100% by mass of the polyester resin composition.

* * * * *